E. Z. TROMBLEY.
GAS STOVE ATTACHMENT.
APPLICATION FILED JAN. 7, 1916.

1,189,017.

Patented June 27, 1916

WITNESSES

INVENTOR
Edward Z. Trombley

BY

ATTORNEY

UNITED STATES PATENT OFFICE.

EDWARD Z. TROMBLEY, OF ST. JOHNSBURY, VERMONT.

GAS-STOVE ATTACHMENT.

1,189,017. Specification of Letters Patent. Patented June 27, 1916.

Application filed January 7, 1916. Serial No. 70,861.

*To all whom it may concern:*

Be it known that I, EDWARD Z. TROMBLEY, a citizen of the United States, residing at St. Johnsbury, in the county of Caledonia and State of Vermont, have invented certain new and useful Improvements in Gas-Stove Attachments, of which the following is a specification.

This invention relates to an improved gas stove attachment and the principal object of the invention is to provide an attachment which can be mounted upon a gas stove and will permit one burner to heat two pans instead of it being necessary to provide one burner for each pan as is usually the case.

Another object of the invention is to so construct the attachment that one of the pans will be held in spaced relation to the body portion of the attachment thus permitting the escape of heated air and gases out of the interior of the attachment.

Another object of the invention is to provide a device which can be formed of sheet metal and will be strong and durable but at the same time comparatively cheap in production.

This invention is illustrated in the accompanying drawings, wherein:—

Figure 1:
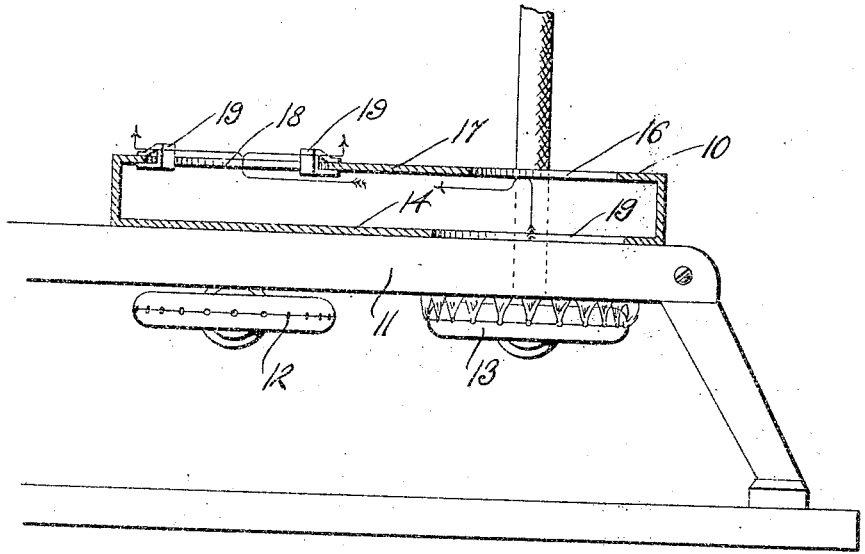
Figure 2:
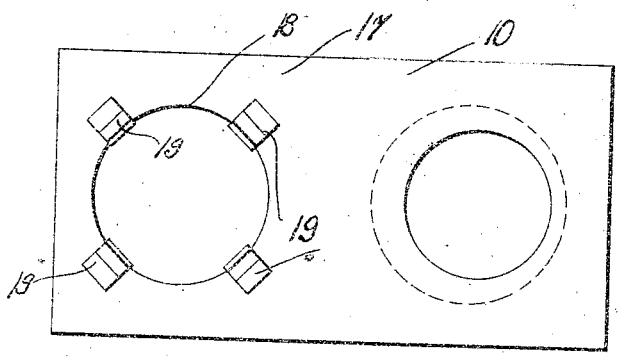

Figure 1 is a view showing the gas stove in elevation and the attachment in longitudinal section. Fig. 2 is a view showing the attachment in top plan.

This attachment is in the form of a box or housing 10 which is placed upon the gas stove 11 above the burners 12 and 13 and has its lower wall 14 provided with an inlet opening 15 positioned above the burner 13 and beneath the opening 16 in the upper wall 17 of the housing. One pan will be placed over the opening 16 thus closing the opening and causing the heat and gases to be directed through the housing and out through the second opening 18 formed in the opposite end portion of the housing. Clips or spacing elements 19 are connected with the upper wall at the edges of the opening 18 and extend above the upper wall of the housing for some distance as shown in Fig. 1 thus holding the pan placed above this opening a sufficient distance above the housing to permit the air and gases to escape around the pan as indicated by the arrows. These clips can if desired be formed of resilient metal so that they can be detachably but firmly held in place and if necessary moved from the position shown in Fig. 2 to that shown in Fig. 1 thus permitting a smaller pan to be supported. It will thus be seen that I have provided an attachment so constructed that it may rest upon the gas stove and the heat from one burner serves to heat two vessels, one of the vessels serving as a cover for the opening provided directly above the inlet opening and the second opening being provided with means for holding the vessel positioned above the same in spaced relation so as to provide an outlet for the gases entering the receptacle or body portion.

What is claimed is:

A device of the character described comprising a housing having a lower wall provided with an inlet opening and an upper wall provided with an outlet opening, and supporting clips removably connected with the upper wall about the edge portions of the outlet opening, each clip being formed from a strip of resilient material bent intermediate its length to provide a standard having upper and lower clamping arms extending therefrom, the lower clamping arm engaging the inner face of the upper wall and the upper arm extending in converging relation to the lower arm and having its free end portion bent to extend substantially parallel to the lower arm and engage the outer face of the upper wall and clamp the upper wall of the housing between the upper and lower arms of the clip.

In testimony where I affix my signature in presence of two witnesses.

EDWARD Z. TROMBLEY.

Witnesses:
S. OSCAR LANCLOT,
W. E. RACETTE.